(12) United States Patent
Willschuetz et al.

(10) Patent No.: US 6,752,175 B1
(45) Date of Patent: Jun. 22, 2004

(54) AUXILIARY DEVICE FOR REPAIRING A PIPELINE

(75) Inventors: Klaus-Dieter Willschuetz, Pentruper Str. 51, D-48268, Greven (DE); Hans-Georg Willschuetz, Dresden (DE)

(73) Assignee: Klaus-Dieter Willschuetz, Greven (DE)

( * ) Notice: Subject to any disclaimer, the term of this patent is extended or adjusted under 35 U.S.C. 154(b) by 0 days.

(21) Appl. No.: 09/914,692

(22) PCT Filed: Mar. 2, 2000

(86) PCT No.: PCT/EP00/01776
§ 371 (c)(1),
(2), (4) Date: Sep. 27, 2001

(87) PCT Pub. No.: WO00/53969
PCT Pub. Date: Sep. 14, 2000

(30) Foreign Application Priority Data

Mar. 5, 1999 (DE) ......................... 199 09 634

(51) Int. Cl.[7] ............................................. F16L 55/10
(52) U.S. Cl. ............................. 138/90; 138/93; 138/98
(58) Field of Search .............................. 138/97, 98, 93, 138/90, 89

(56) References Cited

U.S. PATENT DOCUMENTS

| | | | | |
|---|---|---|---|---|
| 2,315,133 A | * | 3/1943 | Riney et al. ........... | 15/104.061 |
| 2,575,624 A | * | 11/1951 | Hall ...................... | 15/104.061 |
| 2,860,356 A | * | 11/1958 | Matheny ................ | 15/104.061 |
| 3,495,546 A | * | 2/1970 | Brown et al. ............... | 104/155 |
| 3,708,819 A | * | 1/1973 | Breston ................. | 15/104.061 |
| 3,758,050 A | * | 9/1973 | Watts et al. ................ | 406/190 |
| 4,105,972 A | * | 8/1978 | Smith .......................... | 324/220 |
| 4,769,598 A | * | 9/1988 | Krieg et al. ................. | 324/219 |
| 5,208,936 A | * | 5/1993 | Campbell .............. | 15/104.061 |
| 6,098,231 A | * | 8/2000 | Smith et al. .......... | 15/104.061 |
| 6,190,090 B1 | * | 2/2001 | Campbell et al. ........ | 405/211.1 |

FOREIGN PATENT DOCUMENTS

| | | |
|---|---|---|
| DE | 4315927 | 11/1994 |
| GB | 2326209 | 12/1998 |
| WO | WO8908217 | 9/1989 |
| WO | WO9717566 | 5/1997 |

* cited by examiner

Primary Examiner—James Hook
(74) Attorney, Agent, or Firm—Milde & Hoffberg, LLP

(57) ABSTRACT

An auxiliary device (100) is provided for repairing a pipeline and sealing small damages (5) in a wall (4) of a pipeline. A working space (8) is created between the interior of the pipeline (93) and the outer circumference of the base element (22) when the auxiliary device (100) for repairing a pipeline is pushed into a pipeline. The working space (8) can be sealed in the axial direction of the pipeline (3) and in a jointing manner by way of the expanding sealing collars (24,25). The auxiliary device (100) is provided with a transport module (40) that is articulated to the sealing module (20). The device can be transported through the fluid flow by means of the transport module (40).

9 Claims, 3 Drawing Sheets

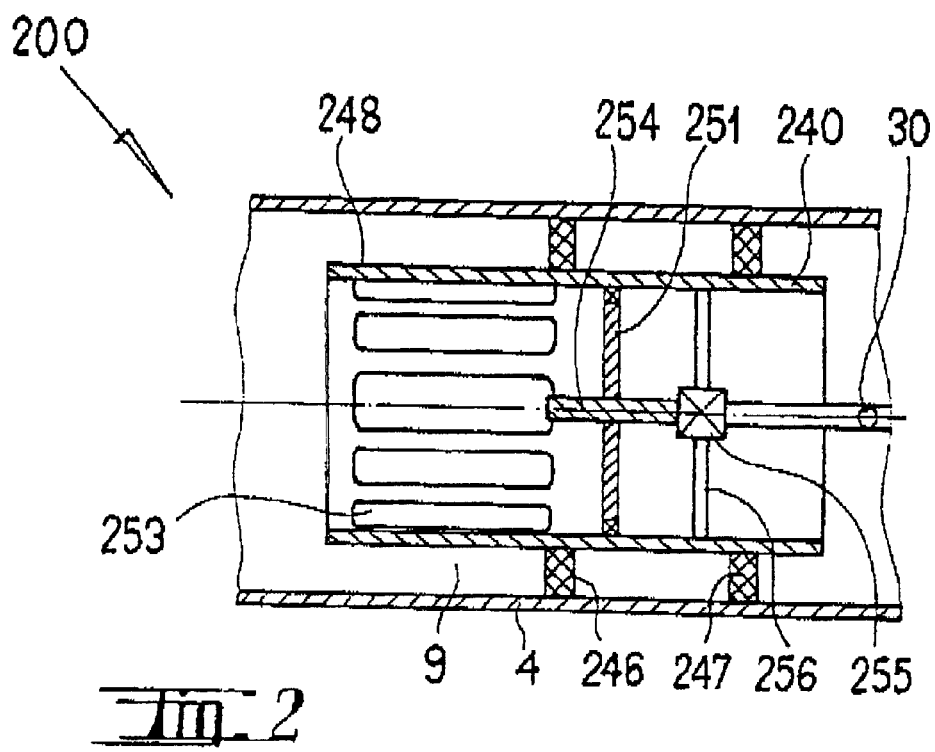
_Fig. 2_
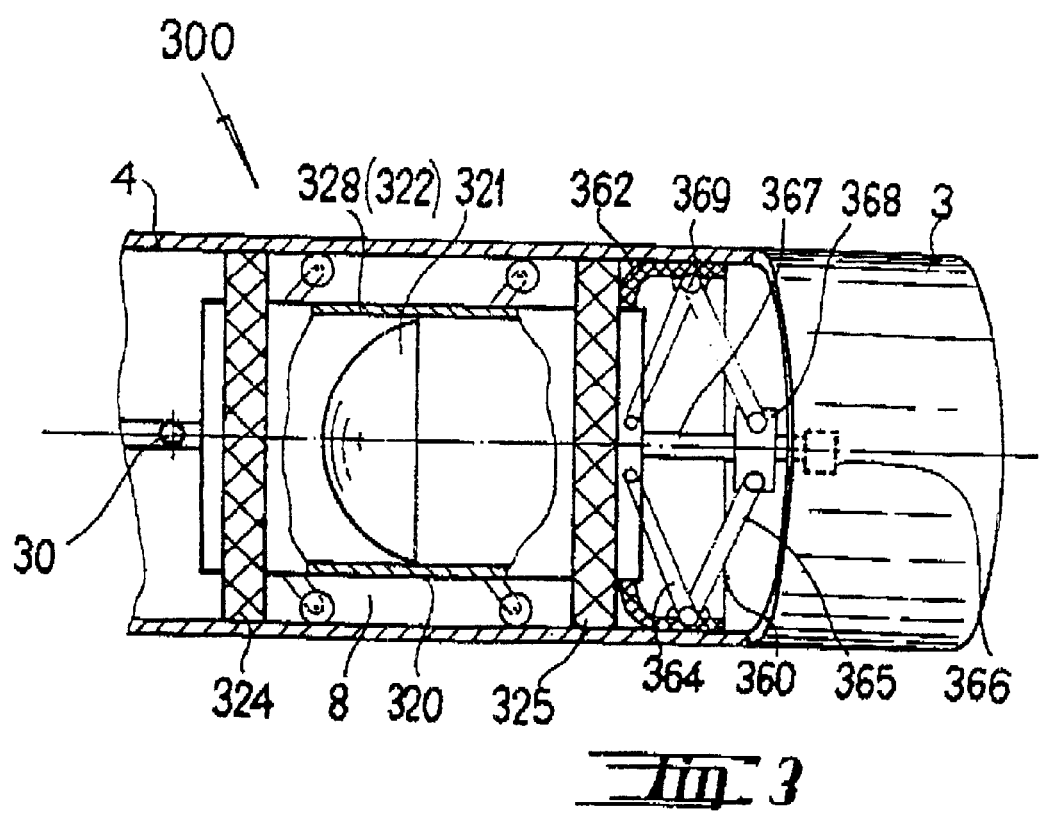
_Fig. 3_

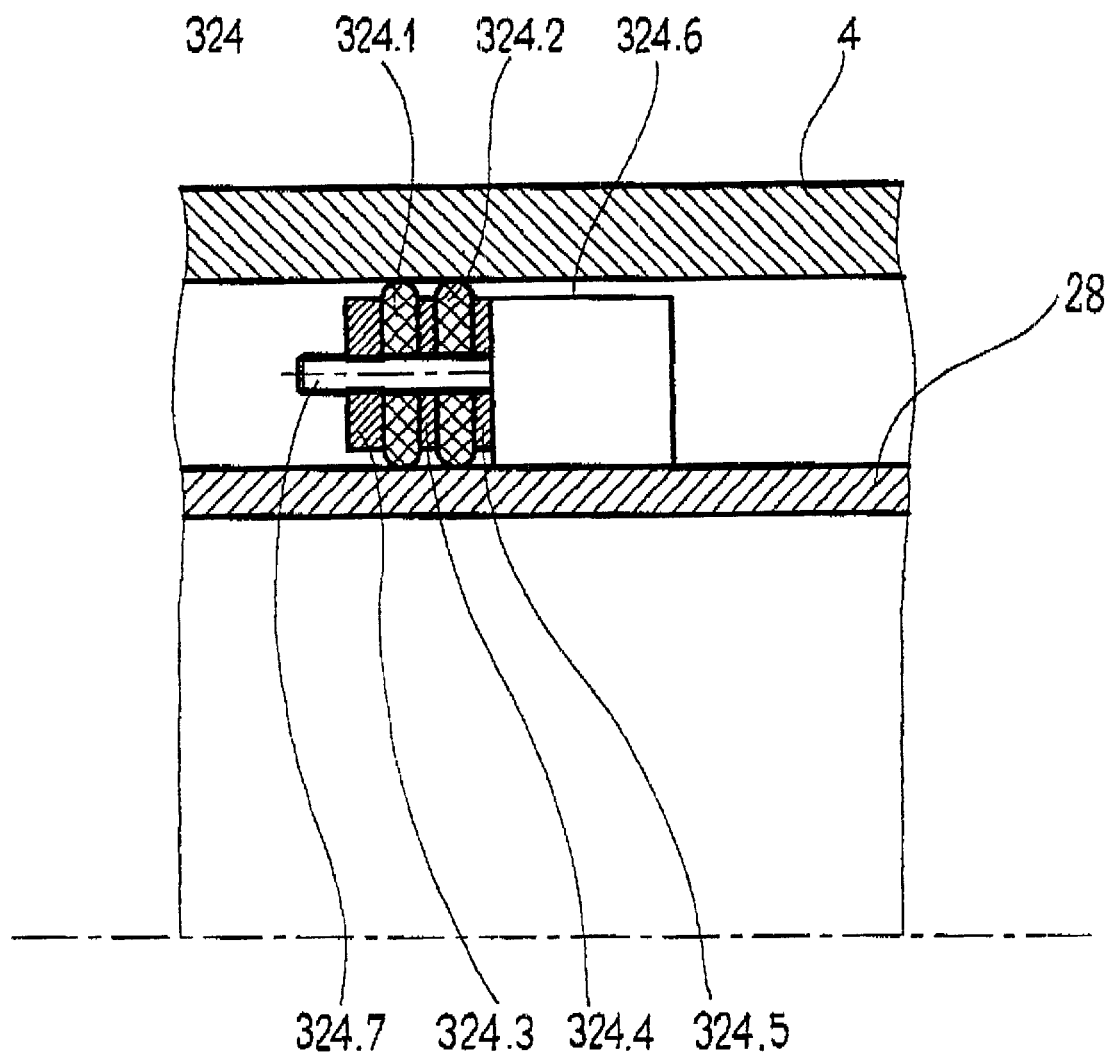

AUXILIARY DEVICE FOR REPAIRING A PIPELINE

BACKGROUND OF THE INVENTION

The invention is an auxiliary device for pipeline repairs for sealing a damaged position in the pipeline-wall of a circular-tubular-shaped pipeline against fluid which flows through the pipeline and comprising at least one sealing module with at least two radially expandable sealing collars positioned with a distance in-between, and connected through one base element. In the expanded state, the collars are pressed against the internal pipeline wall in a friction-contacting and pressure-tight manner whereby the base element consists of at least one bypass lead-pipe which is capable of containing the flow-through of the fluid in a direction axial to the pipeline and whose circumferential radius is smaller than the internal radius of the pipeline wall and smaller than the external radius of the expanded sealing collars in such a way that a working space sealed in a pressure-tight manner between the inner side of the pipeline wall and the outside area of the base element can be formed between the expanded sealing collars.

An auxiliary device for pipeline repairs of the type described in the introduction above, is know through "News from PSI" of the company PSI Plugging Specialists International A/S, Stavanger, Norway. This device may, for instance, be inserted into the affected pipeline section in an upstream location ahead of the damaged position and seal the pipeline across its entire cross-section.

By inflating the sealing collars with compressed air, the pressure of the sealing collars, in their external circumference, is brought to bear on the internal wall of the pipeline thus sealing the damaged position. Together with a further auxiliary device for pipeline repairs placed downstream to the damaged position, the damaged position can be isolated in such a way that only the pipeline section lying in-between the two devices can be drained from the outside, which in turn, enables the repair or replacement of the damaged pipeline wall.

However it is still of disadvantage that the pipeline cannot be used for conveyance throughout the repair works. Moreover, a safe sealing is only possible for lines that have been depressurized between two pumping stations, as unintended displacement may be triggered off in case of high pressure. Especially in the case of a conveyance of compressible media like natural gas in the pipeline, a considerable volume must be pressed into the line after the repair work, in order to restore the operating pressure of 40 to 100 bar (4 to 10 MPa) in the repaired section.

A type-conforming device in which an open, hollow-cylindrical body is installed into the longitudinal direction of the pipeline is known through the German Patent No. DE 43 15 927. The device serves the special purpose of sealing and repairing damaged underground pipelines. For the device, an arrestable pig fitted with hose lines and similar connections is equally applied in a similar manner pursuant to International Patent Publication No. WO 89/08217 in such a way that only a pull through the pipeline is enabled. A procedure with the aid of the flowing medium is not provided for. Therefore, in the course of counter-holding, the "pigs" are not washed away with the fluid-stream. The distance covered is limited by the length of the supply lines. At the end of work, the pigs must be pulled out of the pipeline and are therefore applicable only in pressureless lines.

A pipeline servicing device fitted with measurement sensors with which the pipeline wall can be inspected for damaged positions is known from the British Patent No. GB 2326 209. The pipeline servicing device comprises a by-pass lead pipe capable of conducting a fluid flow-through in the axial direction of the pipeline with its circumferential radius is smaller than the internal radius of the pipeline wall. The by-pass lead pipe is fitted with means for the regulation of the fluid-flow resistance of the auxiliary device for pipeline repairs in such a way that the auxiliary device can be displaced in the pipeline by the flowing fluid, and path control with which the flow-resistance can be reduced upon arrival at the damaged position is enabled in such a way that the pipeline servicing device is slowed at a pre-determined position. It is however impossible to perform repair works with the pipeline servicing device at the detected damage position as long as fluid is still flowing through the pipeline.

The principal object of the present invention, therefore, is to provide an auxiliary device for pipeline repairs with which the repair or replacement of a damaged position in a pipeline wall is possible, or the installation of a branch conduit can be realized, while the pipeline or "conveyance", operation is maintained and no loss of natural gas, petroleum oil or other transported media is incurred.

SUMMARY OF THE INVENTION

This object, as well as ther objects which will become apparent from the discussion that follows, are achieved, according to the present invention, by providing a working space between the interior of a pipeline and the outer circumference of the base element when the auxiliary device for repairing a pipeline is pushed into a pipeline. The working space can be sealed in the axial direction of the pipeline and in a jointing manner by means of the expanding sealing collars. The auxiliary device is provided with a conveyance or transport module that is articulated to the sealing module. This device can then be transported through the fluid flow by means of the transport module.

The major difference with respect to the state of the art, in accordance with the last-mentioned references, is that, when the auxiliary device is run to a specific position of the pipeline, it stays there and offers the opportunities of repairing the damaged position of a pipeline as well as enabling the construction of a branch conduit. Therefore, there is no outward physical connection, rather only one wireless connection.

A major advantage of the present auxiliary device for pipeline repairs is that, by this means, an opening can be isolated in the pipeline wall through a working space, while the fluid which still continues to flow through the line. In other words, in the region between the sealing collars, the pipeline wall bears no load through internal pressure. For instance, the working space can also be rendered inert by having it filled up with nitrogen in such a way that it is safe to also work on the pipeline walls of natural gas pipelines while they are still in conveyance operation.

The pipeline wall can be filed through to the inside of the pipe and re-welded for the purpose of repairs. There too, boring can be performed for the creation of a branch conduit of the line. The conveyance operation can be maintained in the process; by-passing the repair position through other pipeline networks may become unnecessary.

Through the minimum of one by-pass lead-pipe, a large part of the flow-volume usually conveyed by the pipeline can be channeled through. Therefore, in the case of the present auxiliary device for pipeline repairs, according to the invention, the conveyance pressure may only be reduced as far as is required for keeping the clamping force of the sealing module on the pipeline wall constantly higher than the flow-resistance, which is based on the cross-section contraction exerted by one of the auxiliary devices for pipeline repairs in the stream-conducting pipeline.

Since according to the law of HAGEN-POISEUILLE, the flow-volume in a circular pipe increases with the fourth power of the pipe radius at a given pressure difference, it is of advantage for the cross section area of the by-pass lead-pipe to make up 60% to 90% of the cross section area of the pipeline. With this value, the throughput losses experienced in the course of a repair operation with the present auxiliary device for pipeline repairs are so minimal that an economic conveyance operation in the pipeline is maintained during repairs. As long as the auxiliary device for pipeline repairs generates only a minimum cross-section contraction and only a slight flow-obstruction is thereby experienced at a specific flow-rate, the conveyance operation can even be maintained without limitations.

A circular-ring-form of the isolatable working area surrounding a spherical by-pass lead pipe constitutes a model which, amongst others, is of advantage in view of pressure resistance.

Other cross-section forms are, however, not to be excluded.

In this way, the base element can also comprise a bundle of by-pass pipelines or have a polygonal cross-section. Most important is that a working area, which is to be shielded off from the conveyor stream, can be formed between the circumference of the base element and the internal pipeline wall, whereby the working area shall cover the entire circumference of the auxiliary device for pipeline repairs or only a segment of it.

To deter an unintended axial and/or radial displacement of the auxiliary device for pipeline repairs during repair operations, it is advantageous to provide the equipment of the auxiliary device for pipeline repairs with at least one locking element positioned within the working area for a form-fitting fixation on a lock-absorbing facility in or on the pipeline wall.

The locking element may be a draw-out bolt which can be inserted in a compatible bolt-receiving arrangement in the pipeline wall. Alternatively, by boring a hole, a bolt may be positioned through the outside of the pipeline and can be fixed in a compatible bolt-absorbing facility placed in the working area.

With the locking element, one ensures that the auxiliary device for pipeline repairs is axially fixed during repair operations and that the outflow of fluids at the damaged position is prevented also in the course of overcoming the clamping force of the sealing collars as a result of high impact pressure.

After measuring the pipeline diameter, the conveyance module may be united with the working module, i.e. integrated in such a way that only one pig body consisting of conveyance and working unit is available. On the other hand, the auxiliary device for pipeline repairs can also contain a conveyance module with a bypass lead pipe connected with the sealing module in an articulated manner. Means for moving the auxiliary device for pipeline repairs within the pipeline can be integrated into the conveyance module. Through the subdivision of the auxiliary device for pipeline repairs into flexibly joined modules, a smaller curve radius can be run as against a rigid connection of larger dimensions. It has however, been shown that by miniaturizing the insertion elements, devices can be adapted at different pipeline diameters.

Also of advantage is one further model in which the conveyance module and/or sealing module or the integrated device contains at least two circularly formed drive-guide-collars in such a way that a displacement of the auxiliary device for pipeline repairs over a pipeline path segment within the pipeline indicating a pressure difference, is enabled. With the drive-guide-collars, the axial orientation of the auxiliary device for pipeline repairs en route to the damaged position is improved and jamming prevented. The diameter of the sealing collars can also be reduced to such an extent that prior to their expansion, they do not contact the pipeline wall during curve runs. By this means, damages to, or soiling of the sealing collars are avoided before the auxiliary device for pipeline repairs arrive the damaged position.

In order to achieve a good sealing of the pipeline wall and thereby enable the advancement of the auxiliary device for pipeline repairs alongside a pressure difference in the pipeline, the drive-guide-collars have a diameter corresponding with the internal diameter of the pipeline in addition to an allowance of 5% to 10%.

The auxiliary device for pipeline repairs may also be fitted with track-rollers for its movement to the working location. For this purpose, the conveyance module and/or the sealing module have at least two axially spaced rows positioned on the circumference of the base element with at least two track-rollers each. Preferentially, there are three track-rollers per row evenly distributed over the circumference, in such a way that a centric support of the auxiliary device for pipeline repairs is ensured within the pipeline, even in curves and slope sections.

To be able to run directly to a specific damaged position in the pipeline wall, a design-form is beneficial, in which a window piston is positioned in the by-pass lead-pipe of the sealing module and/or in the by-pass lead-pipe of the conveyance module which is made of one of the piston plates covering the cross-section area of the by-pass lead-pipe and a cylinder liner element connected with it. The cylinder liner element is provided with at least one window opening whereby the window piston can be drawn out axially from the by-pass lead-pipe in such a way that at least one window opening lies at least partially outside the bypass lead-pipe and an outflow of fluids from the bypass lead-pipe is enabled. In this way, the fluid volume-flow and thereby the flow-resistance of the auxiliary device for pipeline repairs can be varied by adjusting the window piston. In case the windows are inside the bypass lead-pipe, the flow is bound to run against the auxiliary device inside the pipeline through its entire cross-section. Should there be a pressure difference in the section, the auxiliary device for pipeline repairs will be pushed through the pipeline as a result of the dynamic stagnation pressure. Before arriving at the envisaged damaged position, an adjustment of the window piston can be triggered through a remote control, which in turn causes the window opening to protrude at least partially from the bypass lead-pipe and make it conducive to flow-through. The flow-resistance is thereby reduced in such a way that the friction between, for instance, the drive-guide-collars and the pipeline wall is no longer surmounted and the auxiliary device for pipeline repairs stops at the predetermined position in the pipeline section.

The principle of path control through the regulation of the flow-resistance is also applicable to at least one more model in which the bypass lead-pipe of the sealing module on at least one end, and/or the bypass lead-pipe of the conveyance module, has the following elements:

at least one window opening, and at least one piston covering the cross-section area of the bypass lead-pipe, which is adjustable along the axial length of at least one window opening.

In this case, the piston is first positioned in an upstream manner. For speed reduction, the piston can then be run in such a way that the volume flow through the window opening and out of the by-pass lead pipe is enhanced.

At least one butterfly valve element capable of rotating around an axis, positioned in an angle of 45° to 90° to the central axis of the bypass lead-pipe, can also be installed for the purpose of regulating the flow-resistance in the bypass lead-pipe of the sealing module and/or in the bypass lead-pipe of the conveyance module.

The butterfly valve element may be ball-shaped or consist of several segments of a ball, capable of rotating in an overlapping manner, so that the cross-section of the by-pass lead-pipe is completely covered in the closed state. In the open state, the convex external sides of the ball-segments are set in the direction of the pipeline wall, which in turn minimizes the area exposed to streaming.

The butterfly valve element may also be disc-shaped. While the butterfly valve element which, in its closed state, is positioned diagonally to the axis of the bypass lead-pipe, effects a complete cross-section coverage, only the edge of the butterfly valve element is subjected to the streaming contact in an open position which is set at 90° for this purpose. A reduced flow-resistance is thereby achieved.

To reduce the flow-resistance of the auxiliary device for pipeline repairs during work on the de-pressurized working space and thereby increase safety against unintended displacement of the device, it is suggested that the upstream-oriented end of the sealing module be equipped with a reduction funnel whose external diameter amounts to 0.9 to 1.0-fold of the internal diameter of the pipeline and whose internal diameter corresponds with the internal diameter of the bypass lead-pipe. The funnel wall should be preferably inclined at an angle of less than 45° to the pipeline axis.

Another advantage is offered by a model with a sealing module fitted with at least one motor-driven folding and unfolding funnel shield, with at least one slip-ring made of elastomer. The sealing of the working space can be performed with the funnel shield in place of, or supplementary to, a sealing collar. The funnel shield should preferably be folded and unfolded with the aid of toggle levers. Upon arrival at the damaged position, the funnel shield is run out. Through the high pressure of the fluid flowing against the auxiliary device for pipeline repairs, at least one slip-ring is pressed into the area between the outside of the by-pass lead-pipe and the internal wall of the pipeline where it is axially pressed against the sealing collar or against a separate support ring. The slip-ring of the funnel shield should preferably have an L- or C-shaped cross-section, whereby one upstream-oriented limb is aligned parallel to the wall of the pipeline. The slip-ring is then also pressed against the wall of the pipeline in an axial direction through the internal pressure in the pipeline.

The invention and its application in the repairs of a pipeline and other operations in the course of the conveyance will be explained in detail with an embodiment as follows and with reference to the accompanying drawings.

BRIEF DESCRIPTION OF THE DRAWINGS

FIG. 2 is an axial cross-sectional view of another embodiment of the conveyance module.

FIG. 3 is an axial cross-sectional view of another embodiment of the sealing module.

FIG. 4 is an axial cross-sectional view of another embodiment of a sealing collar in detail.

DESCRIPTION OF THE PREFERRED EMBODIMENTS

Figure 1:
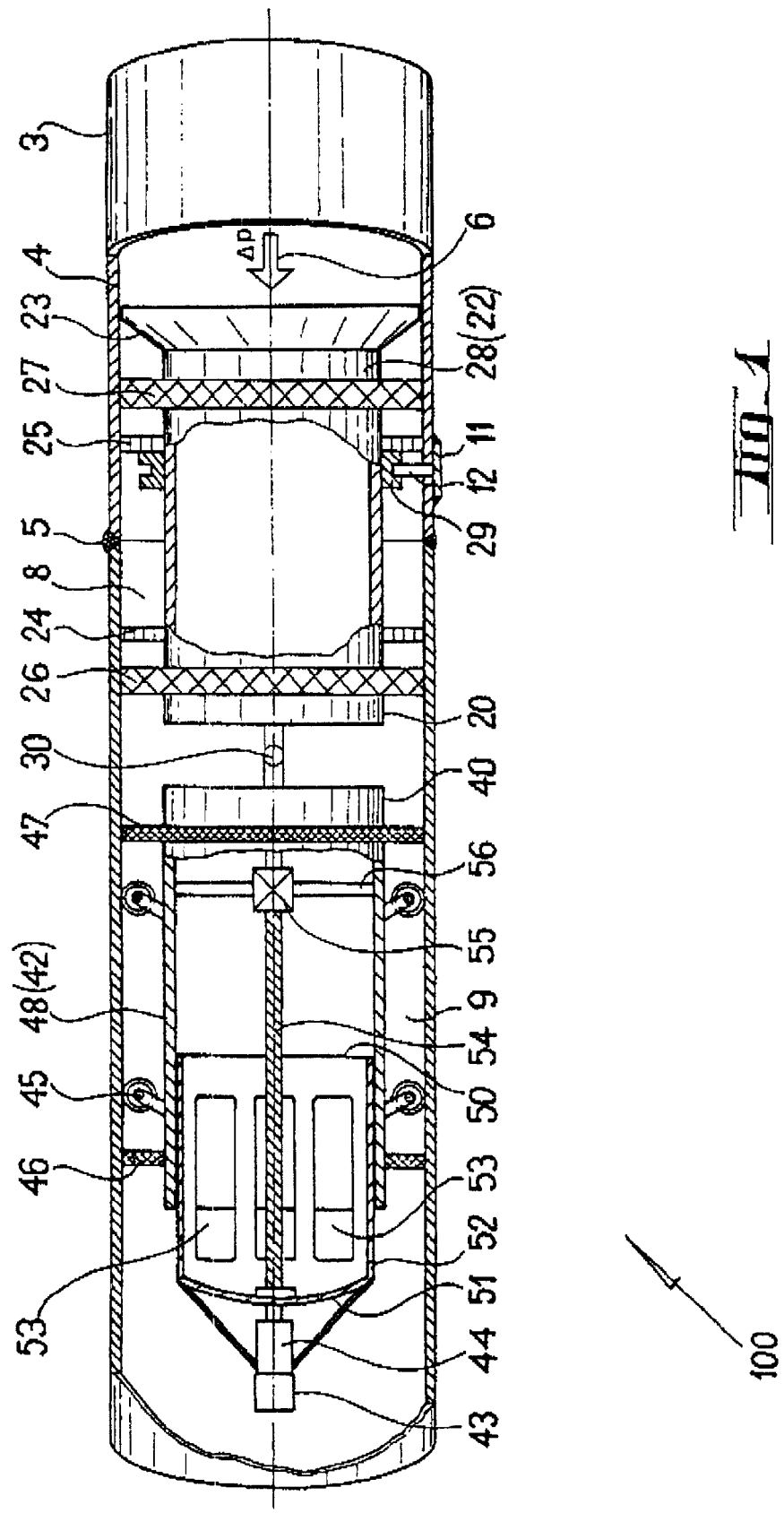
FIG. 1 is an axial cross-sectional view of an auxiliary device for pipeline repairs pushed into a pipeline with a conveyance module and a sealing module.

The preferred embodiments of the present invention will now be described with reference to FIGS. 1–4 are designated with the same reference numerals.

FIG. 1 shows a pipeline 3, with parts of the pipeline wall 4 cut away, in such a way that the auxiliary device for pipeline repairs 100 launched into the pipeline 3 can be seen clearly. The pipeline wall 4 shows a damaged part 5 in the area of a welded seam.

The auxiliary device for pipeline repairs 100 is made of a chain of modules, namely a sealing module 20 and a conveyance or transport module 40 flexibly inter-connected over a universal joint 30. Alternatively, the conveyance module 40 and the sealing module 20 can be assembled into a single piece on a common base element 22. The subdivision into individual modules 20, 40 as shown in FIG. 1, however, enables run-through on tight curve radii in the pipeline 3; moreover, in case of defects on parts of the auxiliary device for pipeline repairs 100, a simple replacement of the modules is facilitated.

Both the conveyance module 40 as well as the sealing module 20 are assembled on circular by-pass lead-pipes 28, 48, which at the same time, form the base element 22, 42. The external diameter of the bypass lead-pipes 28, 48 is smaller than the internal diameter of the pipeline 3, in such a way that an unsealed annular space 9 or and an isolatable working space 8 is formed between the external wall of the bypass lead-pipes 28, 48 and the internal wall surface of the pipeline 3, respectively.

The conveyance module 40 contains elements for the control of the entire auxiliary device for pipeline repairs 100 within the pipeline 3. For this purpose, the conveyance module 40 contains a control and receiver and/or transmitting facility 44, which enables the location of the auxiliary device for pipeline repairs 100 from the outside of the buried pipeline 3 through known communication facilities as well as the remote-control from the outside, of the adjusting elements of the auxiliary device for pipeline repairs 100. For instance, the transmission of control commands to the auxiliary device for pipeline repairs via low-powered gamma ray transmitters, and corresponding gamma ray receivers, through the pipeline wall can be performed from outside the pipeline.

There is a pressure difference Δp in the pipeline 3 indicated by an arrow 6. First, the fluid flows through the opened by-pass lead-pipes 28, 48 and through the open windows 53 of the window piston 50, in such a way that the stream flows only to the annular area between the outside of the by-pass lead-pipes 28 and the internal wall of the pipeline 3, which leads to the generation of a downstreamoriented force affecting the auxiliary device for pipeline repairs 100 at the given pressure Δp. The force required for surmounting the adhesive friction between the pipeline wall 4 and the drive-guide-collars 26, 27; 46, 47 is higher than the active thrust force applicable in case of the opened by-pass lead-pipes 28, 48 at a given operating pressure difference Δp in the pipeline section, in such a way that the auxiliary device for pipeline repairs 100 first ceases to advance further.

A driving element 55, which drives a worm shaft 54, is centrally positioned inside the by-pass lead-pipe 48 over several support spokes 56. The worm shaft 54 locks up in a spindle nut, that is not described in detail, in the center of the piston plate 51. A translatory movement of the window piston 50 is effected through rotation.

To introduce a movement of the auxiliary device for pipeline repairs 100 within the pipeline 3, the window piston 50 is run upstream in such a way that the window openings 53 in the cylinder liner element 52 of the window piston 50 lie at least partially inside the wall of the by-pass lead-pipe 48 and are covered by them. The flow-through through the auxiliary device for pipeline repairs 100 is reduced and the stagnation pressure rises in such a way that the driving force mounts until the adhesive friction between the pipeline wall 4 and the drive-guide-collars 26, 27; 46, 47 can be surmounted. Through the pressure difference in the pipeline section, the auxiliary device for pipeline repairs 100 is now pushed through the pipeline 3, until the window piston is run-out again shortly before arriving the defect area 5, which in turn leads to a drop in the flow-resistance and thereby, the stagnation pressure. A balance is achieved between the driving force and the friction force in such a way that the auxiliary device for pipeline repairs 100 is stopped. For the fine adjustment of the final position of the auxiliary device for pipeline repairs 100, the conveyance module 40 is fitted with driven track-rollers 45. The drives are powered by an energy storing element 43.

The adjustment of the window piston 50 can be performed through the worm shaft 54 driven by electrical-motor. It is however, also possible to release an arresting system at the envisaged stopping point which in turn, enhances an automatic forward push of the window piston 50 as a result of the fluid-pressure and the release by the window piston of the window openings 53. At the end of the repair work, a pre-stressed coil spring or compression spring which leads the window piston 50 back to the locking position and retains it there, is activated.

The expansion of the sealing collars 26, 27 is triggered off at the damaged position 5, for instance through the introduction of compressed air from a compressed air storage system (not shown in the illustration) into the hollow chambers in the sealing collars 26, 27. The sealing collars 26, 27 then press against the internal wall of the pipeline 3 in their entire circumference and effect the sealing of the working space 8 against the fluid flowing in the pipeline (3).

The damaged position 5 is thereby separated from the diverted fluid flowing through the by-pass lead-pipes 28, 48. It is possible to cut the pipeline wall completely and renew parts of the wall.

The possible detachment of the sealing module 20 during repair efforts on the pipeline interior surface 4 must be at least avoided. Therefore, the sealing module 20 includes a locking receptacle device 29 positioned in the working space 8 that consists of a ring with a U-shaped cross section completely surrounding the bypass pipe 28. A hole is drilled in the pipeline interior surface 4 through a sleeve 11 welded to the pipeline 3 that has spherical cock with a round passage, and the working space 8 is depressurized. A locking receptacle element 12 is further inserted through the sleeve 11 and the hole that engages the U-shaped slot in the locking receptacle device 29 so that the pipeline repair device 100 is held firmly in place by the locking receptacle element 12 by virtue of its form-locking positioning. In order to reduce flow resistance, a reducing funnel 23 is also positioned at the upstream end.

FIG. 2 shows another model of the auxiliary device for pipeline repairs 200 with a by-pass lead-pipe 248 fitted to the conveyance module 240, which has window openings 253 at one end. In the closing position, a piston 251 is placed upstream in front of the window openings 253. By displacing the piston 251 with a worm shaft 254 driven by a drive element 255, a fluid-flow from the by-pass lead-pipe 248 directly through the window openings 253 into the pipeline 3 is enabled in such a way that the stagnation pressure in front of the auxiliary device for pipeline repairs 200 drops.

FIG. 3 shows a model of the auxiliary device for pipeline repairs 300 in which the regulation of the stagnation pressure is performed through a butterfly valve element 321 positioned in the by-pass lead-pipe 328. The rotary axis of the butterfly valve element 321, has been set to an angle of $\alpha=90°$ to the axis of the by-pass lead-pipe 328. By turning the butterfly valve element 321, the flow-through area is varied and the advancing force acting on the auxiliary device for pipeline repairs 300 is thereby regulated. On its way through the pipeline, the auxiliary device for pipeline repairs 300 is forced through the drive-guide collars. When it reaches the damage location, the funnel shield 360 is deployed that is pressed with its slip-ring 362 both axially against the sealing collar 325 and radially against the pipeline interior surface 4 by the high fluid pressure in front of the auxiliary device for pipeline repair 300. Additionally, the sealing collars 324, 325 are expanded and pressed against the pipeline wall 4.

After the repair work, the sealing collars 324, 325 are released, and allow for a pressure balance in the previously depressurized working space 8. By this means, the pressing force on the slip-ring 362 is lifted in such a way that the funnel shield 360 can be folded once again like an umbrella. A spindle nut 368 is run by a worm shaft 367, driven by a drive element 366. The toggle levers 365 connected to the spindle nut 368 are swiveled off from the toggle levers 364 which are permanently installed on the auxiliary device for pipeline repairs 300, in such a way that the joint 369 and the end of the slip-ring 362 connected with it are radially moved inwards.

FIG. 4 illustrates a detailed sectional view of an annular sealing collar 324. This consists of an alternating sequence of pressure rings 324.4, 324.5 and rubber rings 324.1, 324.2. The package formed in this manner lies between a nut ring 324.3 and an adjusting unit 324.6, which, for instance, comprises a motor and a gear. The main drive pinion of the adjusting unit 324.6 is formed by a worm shaft 324.7. Through the rotation of the worm shaft 324.7, the nut ring 324.3 is drawn against the adjusting unit 324.6. The rubber rings 324.1, 324.2 are axially squeezed into the package lying in-between in such a way that they are extended in the radial direction and thereby effect a sealing between the by-pass lead-pipe 328 and the pipeline wall 4. Several adjusting units are preferably, spread over the circumference of the sealing collar 324, in order to achieve an even adjustment and sealing.

There has thus been shown and described a novel auxiliary device for repairing a pipeline which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A pipeline repair device for enabling repair of a damaged location in a pipeline wall of a substantially cylindrical pipeline having an interior surface with an inner radius, while allowing a fluid to flow through the pipeline, said pipeline repair device comprising:

a base element that includes at least one bypass pipe through which the fluid in the pipeline may flow axially and whose outer dimension is smaller than the inner radius of the pipeline wall;

said bypass pipe including means for regulating the flow resistance of the pipeline repair device within the pipeline, such that the pipeline repair device may be transported by the fluid flowing through the pipeline, allowing routing control, and controlled to stop the pipeline repair device at a particular location within the pipeline;

said base element including a sealing module having at least two separated but parallel radially-expandable, sealing collars mounted on and connected to each other by the base element such that, when in expanded condition, they are pressed with a pressure-proof friction fit against the interior surface of the pipeline; and whereby a pressure-proof work space between the interior surface of the pipeline and the outer dimension of the bypass pipe is formed between the expanded sealing collars.

2. Pipeline repair device as set forth in claim 1, further including at least one of a locking element and locking receptacle device positioned within the work space for form-locked positioning in or on the pipeline interior wall.

3. Pipeline repair device as set forth in claim 2, wherein the locking element is an extendable bushing that may be engaged by a suitably-shaped locking receptacle device in the pipeline interior surface.

4. Pipeline repair device as set forth in claim 1, further including at least a sealing module and a transport module connected with it by a flexible connector and a bypass pipe.

5. Pipeline repair device as set forth in claim 4, wherein the transport module and the sealing module include at least two circular drive-guide collars that surround the base element.

6. Pipeline repair device as set forth in claim 5, wherein the diameter of the drive-guide collars corresponds to the interior diameter of the pipeline plus a factor in the range of 5% to 10%.

7. Pipeline repair device as set forth in claim 5, wherein at least one of the transport module and the sealing module include at least two axially-separated rows arranged about the circumference of the base element with at least two movement rollers each.

8. Pipeline repair device as set forth in claim 5, further comprising a window piston disposed within the bypass pipe of the sealing module and the bypass pipe of the transport module formed from a piston plate covering the cross-sectional surface of the bypass pipe and a cylindrical tubular element connected with it that is provided with at least one window recess, wherein the window piston may be displaced axially out of the bypass pipe to the extent that at least one window recess lies at least partially outside the respective bypass pipe, allowing fluids to flow out of the bypass pipe.

9. Pipeline repair device as set forth in claim 5, wherein at least one the bypass pipe of the sealing module and the bypass pipe of the transport module includes:

at least one window recess, and at least one piston covering the cross sectional surface of the bypass pipe that may be displaced along the axial extent of the at least one window recess.

* * * * *